US009108687B2

(12) United States Patent
Lepage (10) Patent No.: US 9,108,687 B2
(45) Date of Patent: Aug. 18, 2015

(54) TRUCK BED EXTENSION

(76) Inventor: Dean Lepage, Regina (CA)

( * ) Notice: Subject to any disclaimer, the term of this patent is extended or adjusted under 35 U.S.C. 154(b) by 0 days.

(21) Appl. No.: 13/808,549

(22) PCT Filed: Jul. 4, 2011

(86) PCT No.: PCT/CA2011/000769
§ 371 (c)(1),
(2), (4) Date: Mar. 28, 2013

(87) PCT Pub. No.: WO2012/003574
PCT Pub. Date: Jan. 12, 2012

(65) Prior Publication Data
US 2013/0175820 A1    Jul. 11, 2013

(30) Foreign Application Priority Data
Jul. 5, 2010    (CA) ...................................... 2708996

(51) Int. Cl.
*B62D 33/033*    (2006.01)
*B60P 3/40*      (2006.01)
*B60R 5/04*      (2006.01)
*B62D 33/027*    (2006.01)
*B60R 9/06*      (2006.01)

(52) U.S. Cl.
CPC .................. *B62D 33/033* (2013.01); *B60P 3/40* (2013.01); *B60R 5/041* (2013.01); *B60R 9/06* (2013.01); *B62D 33/0273* (2013.01); *Y10T 29/49817* (2015.01)

(58) Field of Classification Search
CPC .... B62D 33/033; B62D 33/0273; B60P 3/40; B60R 9/06; B60R 5/41; Y10T 29/49817
USPC ........... 296/26.01, 26.08, 57.1, 61; 29/426.2; 224/402–403
See application file for complete search history.

(56) References Cited

U.S. PATENT DOCUMENTS 2,556,101 A * 6/1951 Negin et al. ................. 296/26.08
2,795,363 A * 6/1957 Turner .......................... 224/526
4,394,947 A * 7/1983 Tartaglia ....................... 224/519
(Continued)

FOREIGN PATENT DOCUMENTS

WO    WO 2008/042085 A2    4/2008
WO    WO 2008/042085 A3    4/2008
WO    WO 2008042085 A2 *  4/2008 ........... B62D 33/027

OTHER PUBLICATIONS

PCT, "International Search Report," PCT/CA2011/000769, Sep. 21, 2011, 3 pages.
(Continued)

*Primary Examiner* — Pinel Romain
(74) *Attorney, Agent, or Firm* — Haynes and Boone LLP (57) ABSTRACT

An apparatus and method for extending a bed of a truck is provided. The apparatus can include a load platform extending substantially outwards from a bed of the truck when the load platform is in position, the load platform having a proximal end and a distal end; and a hitch assembly having a connection arm for insertion into a hitch receiver on the truck and a support arm extending upwards to support at least some of the weight of the load platform. To install the bed extender, a tailgate of the truck can be removed, the hitch assembly inserted into a hitch receiver on the truck the load platform connected to the hitch assembly and positioned to extend from the bed of the truck.

18 Claims, 7 Drawing Sheets

(56) References Cited

U.S. PATENT DOCUMENTS

| | | | |
|---|---|---|---|
| 5,287,579 A * | 2/1994 | Estevez, Jr. | 14/71.1 |
| 5,658,033 A * | 8/1997 | Delaune | 296/26.08 |
| 5,755,480 A | 5/1998 | Bryan | |
| 5,823,597 A * | 10/1998 | Anderson | 296/26.08 |
| 5,829,655 A * | 11/1998 | Salopek | 224/402 |
| 5,938,092 A * | 8/1999 | Johnson | 224/521 |
| 5,954,383 A * | 9/1999 | Beck et al. | 296/50 |
| 6,050,627 A * | 4/2000 | Lee | 296/26.09 |
| 6,113,171 A * | 9/2000 | Stearns | 296/26.08 |
| 6,199,894 B1 * | 3/2001 | Anderson | 280/638 |
| D441,340 S | 5/2001 | Whiteford et al. | |
| 6,244,646 B1 * | 6/2001 | Wheeler, III | 296/26.01 |
| 6,250,874 B1 * | 6/2001 | Cross | 414/537 |
| 6,318,780 B1 * | 11/2001 | St. Aubin | 296/26.09 |
| 6,513,850 B1 * | 2/2003 | Reed | 296/26.08 |
| 6,533,337 B1 * | 3/2003 | Harshman et al. | 296/26.08 |
| 6,536,822 B1 * | 3/2003 | Vagedes et al. | 296/26.1 |
| 6,601,896 B1 * | 8/2003 | Nye et al. | 296/26.13 |
| 6,616,208 B1 * | 9/2003 | Bauer | 296/61 |
| 6,682,114 B1 * | 1/2004 | Cox | 296/26.08 |
| 6,769,583 B1 * | 8/2004 | Gordon et al. | 224/506 |
| 6,834,902 B2 * | 12/2004 | Agan | 296/26.08 |
| 6,964,444 B2 * | 11/2005 | Chumley et al. | 296/26.08 |
| 7,040,643 B1 * | 5/2006 | Eliades | 280/401 |
| 7,070,220 B1 * | 7/2006 | Lantaigne | 296/26.08 |
| 7,128,357 B1 * | 10/2006 | Carroll | 296/61 |
| 7,204,537 B1 * | 4/2007 | Oh et al. | 296/26.09 |
| 7,207,615 B2 * | 4/2007 | St. Romain | 296/26.09 |
| 7,287,779 B2 * | 10/2007 | Miller | 280/781 |
| 7,347,474 B2 * | 3/2008 | Shagbazyan | 296/26.1 |
| 7,393,035 B2 * | 7/2008 | Leitner et al. | 296/26.08 |
| 7,703,825 B2 * | 4/2010 | Brown | 296/26.08 |
| 8,061,754 B1 * | 11/2011 | Webb | 296/61 |
| 8,070,206 B2 * | 12/2011 | Zielinsky | 296/57.1 |
| 8,070,207 B2 * | 12/2011 | Zielinsky | 296/57.1 |
| 8,075,038 B2 * | 12/2011 | Zielinsky | 296/57.1 |
| 8,109,552 B2 * | 2/2012 | Nelson | 296/26.11 |
| 8,276,965 B2 * | 10/2012 | Turnbow | 296/26.1 |
| 8,292,565 B1 * | 10/2012 | Ruff et al. | 414/480 |
| 8,480,149 B2 * | 7/2013 | Durand | 296/26.1 |
| 8,561,238 B1 * | 10/2013 | Inget | 14/71.1 |
| 2002/0140244 A1 * | 10/2002 | Kuhn et al. | 296/26.08 |
| 2003/0080263 A1 * | 5/2003 | McCoy | 296/26.08 |
| 2004/0032141 A1 * | 2/2004 | Moyna | 296/50 |
| 2004/0178649 A1 * | 9/2004 | Agan | 296/26.08 |
| 2005/0023856 A1 * | 2/2005 | Zagoroff | 296/57.1 |
| 2005/0161964 A1 | 7/2005 | Adleman, Jr. | |
| 2005/0263555 A1 * | 12/2005 | Hail et al. | 224/402 |
| 2006/0022481 A1 * | 2/2006 | Hunter | 296/57.1 |
| 2007/0182185 A1 * | 8/2007 | Nichols | 296/26.08 |
| 2007/0284904 A1 * | 12/2007 | Carvalho | 296/57.1 |
| 2008/0030038 A1 | 2/2008 | Brown | |
| 2008/0048465 A1 * | 2/2008 | Hawley | 296/26.11 |
| 2008/0159838 A1 * | 7/2008 | Sherer | 414/537 |
| 2008/0292438 A1 * | 11/2008 | Patterson | 414/537 |
| 2009/0140538 A1 * | 6/2009 | Larson | 296/26.08 |
| 2010/0025955 A1 * | 2/2010 | Carr, Jr. | 280/166 |
| 2010/0032918 A1 * | 2/2010 | Chamoun | 280/30 |
| 2011/0284602 A1 * | 11/2011 | Lamouroux | 224/402 |

OTHER PUBLICATIONS

PCT, "Written Opinion of the International Searching Authority," PCT/CA2011/000769, Sep. 21, 2011, 6 pages.

* cited by examiner

TRUCK BED EXTENSION

CROSS-REFERENCE TO RELATED APPLICATION

This is the national stage of PCT/CA2011/000769, filed Jul. 4, 2011, which claims the benefit of CA 2708996, filed Jul. 5, 2010, the contents of each of which is hereby incorporated herein in its entirety by express reference thereto.

BACKGROUND

A modern pickup truck typically has either a six foot or an eight foot bed. In some cases, it is desirable to have a longer bed length to transport certain loads that do not fit within the bed length. There are a number of truck bed extenders known that allow a user to extend the capacity of his or her truck bed. Typically, these truck bed extenders operate by having the user fold down the tailgate on his or her truck and then providing some sort of structure that surrounds the tailgate so that the tailgate of the truck to becomes part of the cargo bed.

However, a truck tailgate is not very strong and is not designed to handle as much weight as the bed of the truck. The tailgate is typically hinged on the bottom so that it can pivot between an open position, where the tailgate lies flat so that the bed of the truck can be loaded, and a closed position, where it closes the back of the bed of the truck. When the tailgate is in the closed position, it is secured in an upright position by the hinges and latches that mate with the sides of the bed. However, when the tailgate is lying flat in the open position, it is only secured in place by the two hinges and typically a relatively thin steel cord to keep it from pivoting any further around the hinges. Because of the configuration of the tailgate, the tailgate is substantially weaker than the bed of the truck. When a load is placed on a tailgate that is in the open position, the cord and hinges are all that is supporting the load. This can create problems with bed extending structures that use the tailgate to extend the bed length.

Additionally, it has become common to carry all terrain vehicles (ATVs) and other personal recreational vehicles in the bed of trucks. These personal recreational vehicles can be quite heavy. Not only can they place substantial weight on the tailgate of a truck when the tailgate is left in an open position to support a portion of the recreational vehicle, but they can also place substantial weight on the tailgate when a ramp is used to load the vehicle into the bed of a truck. Often, a ramp is used to load these vehicles or other loads into the bed of the truck, with the ramp being positioned with one end on the lowered tailgate and the other end of the ramp on the ground. As the recreational vehicle is being driven up the ramp, the weight of the vehicle forces the ends of the ramp against the open tailgate transferring the weight of the load to the tailgate, which in turn is only supported by a thin steel cord.

SUMMARY OF THE INVENTION

In one aspect, an apparatus for extending a bed of a truck is provided. The apparatus comprises a load platform extending substantially outwards from a bed of the truck when the load platform is in position, the load platform having a proximal end and a distal end; and a hitch assembly having a connection arm for insertion into a hitch receiver on the truck and a support arm extending upwards to support at least some of the weight of the load platform.

In another aspect, a method of installing a bed extender on a truck is provided. The method comprises: removing a tailgate of truck; inserting a hitch assembly into a hitch receiver on the truck; and positioning a load platform connected to the hitch assembly so that the load platform extends from the bed of the truck.

In another aspect, a drawbar can be provided on the hitch assembly to allow a trailer to be connected to the hitch assembly.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
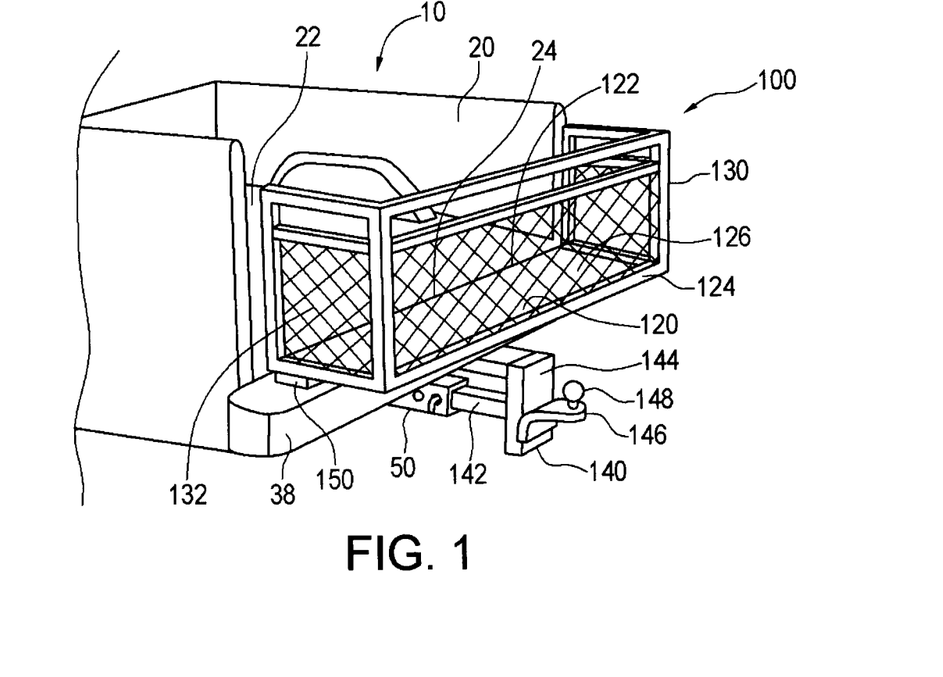
FIG. 1 is a perspective view of a bed extender.
Figure 2:
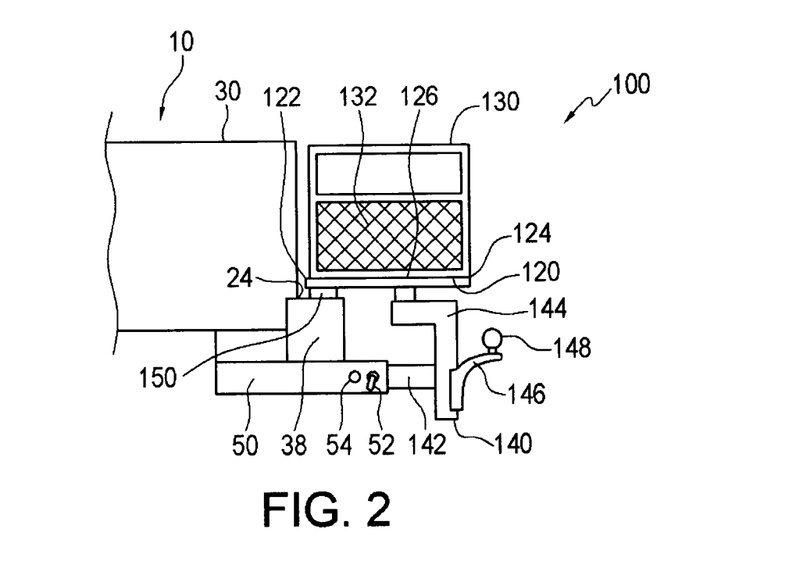
FIG. 2 is a side view of the bed extender of FIG. 1.

FIGS. 1 and 2 illustrate a bed extender 100 for use with a truck 10 to extend the bed 20 of the truck 10. The bed extender 100 can have a load platform 120, a tailgate enclosure 130, and a hitch assembly 140.

The load platform 120 can extend substantially outwards from the floor 22 of the bed 20 of the truck 10 to create a cargo area defined by the bed 20 of the truck 10 and the load platform 120. The load platform 120 can have a proximate end 122, a distal end 124 and support surface 126. The proximate end 122 of the load platform 120 can be positioned adjacent to the end 24 of the bed 20 of the truck 10 when the bed extender 100 is installed on the truck 10 so that the load platform 120 is in a position similar to the position a lowered tailgate would be in.

The load platform 120 can be formed of steel plate, metal mesh or any other suitable material.

A hitch assembly 140 can be provided to support the load platform 120 in place adjacent to the floor 22 of the bed 20 of the truck 10. The hitch assembly 140 can have a connection arm 142 for insertion into a hitch receiver 50 provided on the truck 10. The hitch receiver 50 can be a standard hitch receiver 50 as is known in the art. A support member 144 can extend upwards from the connection arm 142 to support the load platform 120 in place.

In this manner, rather than using the tailgate hinges and a cord (not shown) to keep the load platform 120 in place, weight placed on the load platform 120 can be transferred to the hitch receiver 50 of the truck 10 which is designed to accept a tongue weight when towing a trailer (not shown). The hitch assembly 140 holds the load platform 120 in a fixed and rigid relation to the hitch receiver 50 so that the load platform 120 can not pivot or move substantially vertically relative to the hitch receiver 50 when the connection arm 142 is secured in the hitch receiver 50.

The hitch assembly 140 can be constructed so that it transfers all of the weight placed on the load platform 120 to the hitch receiver 50. Alternatively, in one aspect, pads 150, made of rubber, etc. can be placed under the load platform 120 so that the pads 150 rest on the rear bumper 38 of the truck 10 when the bed extension 100 is in use and the load platform 120 is positioned adjacent the bed 20 of the truck 10. In this manner, any weight placed on the load platform 120 is supported by both the hitch receiver 50 and the rear bumper 38 of the truck 10.

The hitch assembly 140 can also include a drawbar 146 that can be used to pull a trailer (not shown), such as by using the drawbar 146 in conjunction with a hitch ball 148. In one aspect, the hitch assembly 140 can provide various height mounts so that the draw bar 146 can be set at different heights relative to the rest of the hitch assembly 140.

Figure 4:
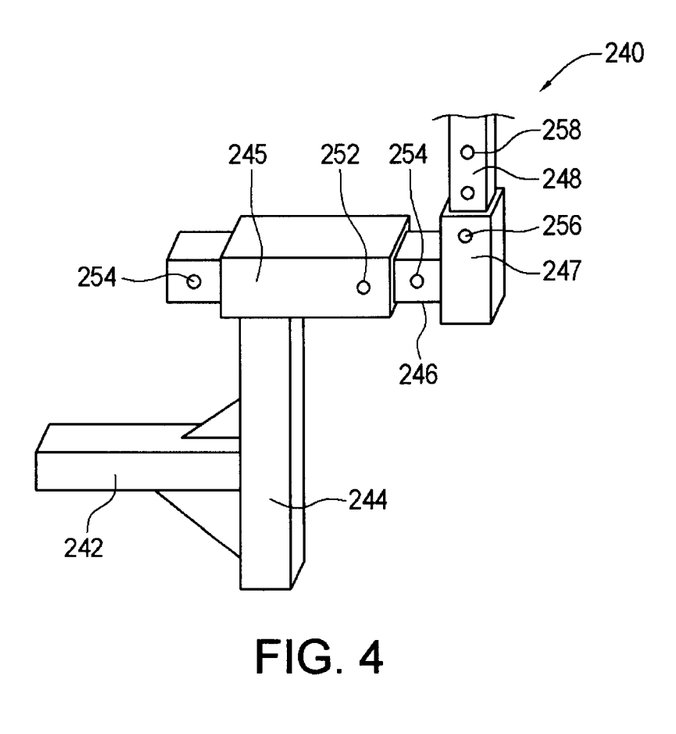
FIG. 4 is a perspective view of an alternative version of a hitch receiver.

Referring to FIG. 4, an alternate hitch assembly 240 can be used. Hitch assembly 240 can also be used to support the load platform 120 in place adjacent to the floor 22 of the bed 20 of the truck 10. The hitch assembly 240 can have a connection arm 242 for insertion into a hitch receiver (not shown). A support member 244 can extend upwards from the connection arm 242. A first extendable member 246 can be provided slidably mounted relative to the support member 244 so that the first extendable member 246 can be moved horizontally relative to the support member 244. A second extendable member 228 can be provided slidably mounted relative to the first extendable member 246, so that the second slidable member can be moved vertically relative to the first extendable member 246 and the connection arm 242. If the load platform 120 is operatively connected to the second slidable member 248, the load platform 120 can be moved vertically relative to a hitch receiver the hitch assembly 240 is inserted in by moving the second extendable member 248 up or down and the load platform 120 can be moved horizontally relative to the hitch receiver the hitch assembly 240 is inserted in by moving the first extendable member 246 horizontally.

In one aspect, the horizontal and vertical positioning of the load platform 120 relative to the hitch receiver 50 can be done by providing a first sleeve 245 through with the first extendable member 246 slides through and a second sleeve 247 through which a second extendable member 248 slides through. A first aperture 252 can be provided in the first sleeve 245 that can be aligned with any of a series of apertures 246 in the first extendable member 246 so that the position of the first extendable member 246 can be fixed by sliding a pin or other member through the aligned apertures 252, 254. A second aperture 256 can provided in the second sleeve 247 that can be aligned with any of series of apertures 258 in the second extendable member 248. The second extendable member 248 can be fixed in a vertical position relative to the second sleeve 247 by aligning the aperture 256 with an aperture 258 in the second sleeve 247 and inserting a pin or other member through the aligned apertures 256, 258.

Referring again to FIGS. 1 and 2, a tailgate enclosure 130 can be pivotally connected to the distal end 124 of the load platform 120. The tailgate enclosure 130 can be used to confine cargo to the extended cargo area defined by the bed 20 of the truck 10 and the load platform 120. In one aspect, side sections 132 can be provided on the tailgate enclosure 130 so that they run substantially along sides of the load platform 120. The side sections 132 can prevent any cargo placed in the bed 20 of the truck 10 or on the load platform 120 from falling off the sides of the load platform 120.

Figure 3:
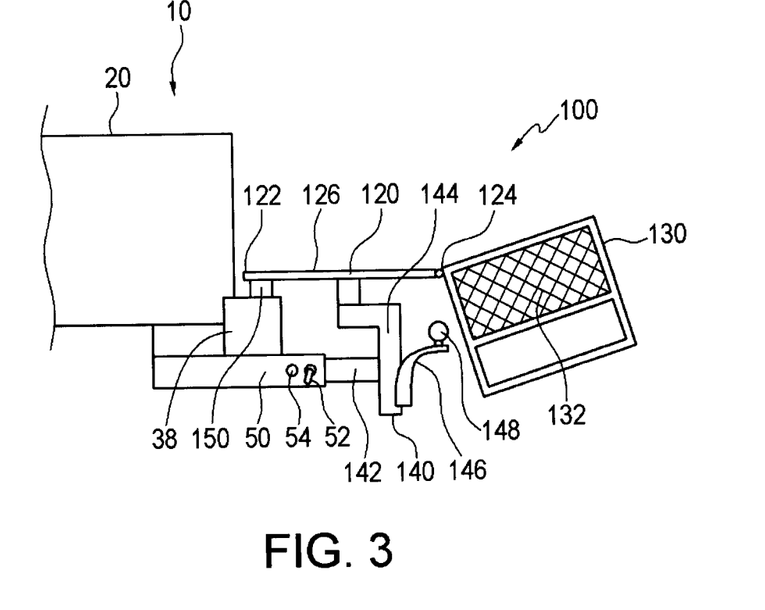
FIG. 3 is a side view of the bed extender of FIG. 1 with a tailgate enclosure pivoted into an open position.

The tailgate enclosure 130 can be pivoted between a closed position and an open position. In the closed position, the tailgate enclosure 130 is pivoted upwards, as shown in FIGS. 1 and 2, and secured in this upright position to enclose cargo in the bed 20 of the truck 10 and the load platform 120. In the open position, the tailgate enclosure 130 is pivoted downwards around the distal end 124 of the load platform 120 as shown in FIG. 3. This allows a person access to the bed 20 of the truck 10 and cargo can be loaded into the cargo area defined by the bed 20 of the truck 10 and the load platform 120 by passing it over top of the tailgate enclosure 130 which is pivoted downwards into its open position.

In one aspect, the tailgate enclosure 130 can be pivoted downwards below the level of the load platform 120 so that ramps 160, as shown in FIG. 4, can be used to load cargo such as personal recreational vehicles and other cargo into the cargo area defined by the bed 20 of the truck 10 and the load platform 120. First ends 162 of the ramps 160 can be placed on or attached to the distal end 124 of the load platform 120 while the second ends 164 of the ramps 160 can be placed on the ground. Cargo can be moved up the ramps 160 and loaded into the cargo area defined by the bed 20 of the truck 10 and the load platform 120.

When cargo is being moved up the ramps 160 to be loaded into the cargo area defined by the bed 20 of the truck 10 and the load platform 120, the force of the cargo exerted the ramps 160 is at least partially transferred through the first ends 162 of the ramps 160 to the distal end 124 of the load platform 120 where this force is in turn transferred through the load platform 120 to the hitch receiver 50 (and the rear bumper 38 of the truck 10 if the pads 150 are used).

Figure 8:
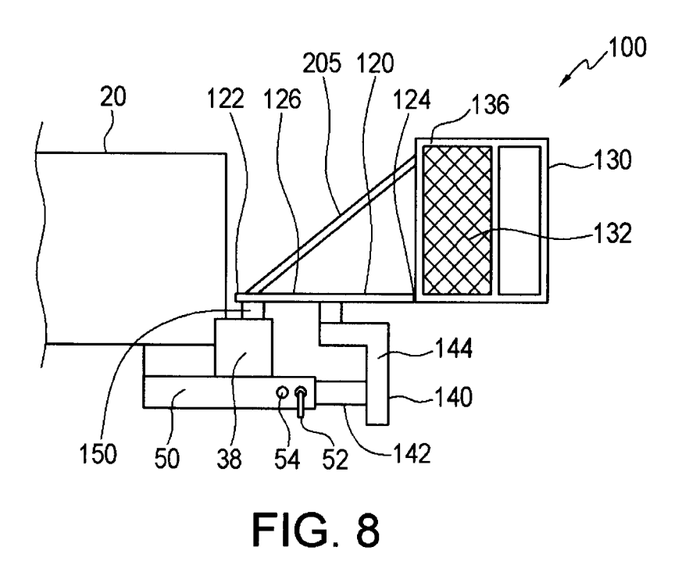
FIG. 8 is a side view of the bed extender with the tailgate enclosure held in place with braces.

In other circumstances, it may be desirable to have the tailgate enclosure 130 so that it does not pivot down below the level of the support surface 126 of the load platform 150 but rather forms an extension of the load platform 120 as shown in FIG. 8. Braces 205 can be provided connected between a bottom corner 136 of the tailgate enclosure 130 and the load platform 120 to secure the tailgate enclosure 130 in this position.

Referring to FIGS. 1 and 2, to install the bed extender 100, the tailgate (not shown) of the truck 10 can be removed from the truck 10. This is typically done by disconnecting the cord (not shown) and removing the hinges of the tailgate from the hinges in the sides of the bed 20 of the truck 10. With the tailgate removed, the hitch assembly 140 can be attached to the truck 10 by inserting the connection arm 142 into the hitch receiver 50 on the truck 10. Typically, a hitch pin 52 is slid through an aperture 54 in the hitch receiver 50 that is aligned with an aperture in the connection arm 142 of the hitch assembly 140. By inserting the connection arm 142 of the hitch assembly 140 into the hitch receiver 50 and securing it in place, the proximate end 122 of the load platform 120 can be positioned adjacent the end 24 of the floor 22 of the bed 20 of the truck 10.

With the hitch assembly 140 connected to the hitch receiver 50 and the load platform 120 positioned adjacent to the bed 20 of the truck 10, the tailgate enclosure 130 can be placed in its upright position and secured in place.

If the hitch assembly 140 includes a draw bar 146, the draw bar 146 can be set to the desired height.

In operation, the bed extension 100 can be used to extend the amount of cargo space in the bed 20 of the truck 10. Rather than being limited to just the floor 22 of the bed 20 of the truck 10, the bed extension 100 allows cargo to extend onto the load platform 120. The weight of any cargo on the load platform 120 is borne by the hitch receiver 50 of the truck 10 (and the rear bumper 38 if the load platform 120 is provided with pads 150).

To load the cargo area of the truck 10, the tailgate enclosure 130 can be moved from its upright closed position to its open position by pivoting the tailgate enclosure 130 around the distal end 124 of the load platform 120 allowing access to the cargo area of the truck 10. With the tailgate enclosure 130 in its open position, a user can then load cargo onto the bed 20 of the truck 10 and the load platform 120. When the truck 10 has been loaded, the tailgate enclosure 130 can be swung back up into its upright closed position and secured in this position. With the tailgate enclosure 130 in its upright closed position, the tailgate enclosure 130 will prevent any of the cargo loaded in the cargo area from falling off the distal end 124 of the load platform 120 and the side sections 132 of the tailgate enclosure 130 will prevent any cargo from falling off of the sides of the load platform 120. With the cargo secured in the cargo area by the tailgate enclosure 130, the truck 10 is then ready to haul the cargo.

Figure 5:
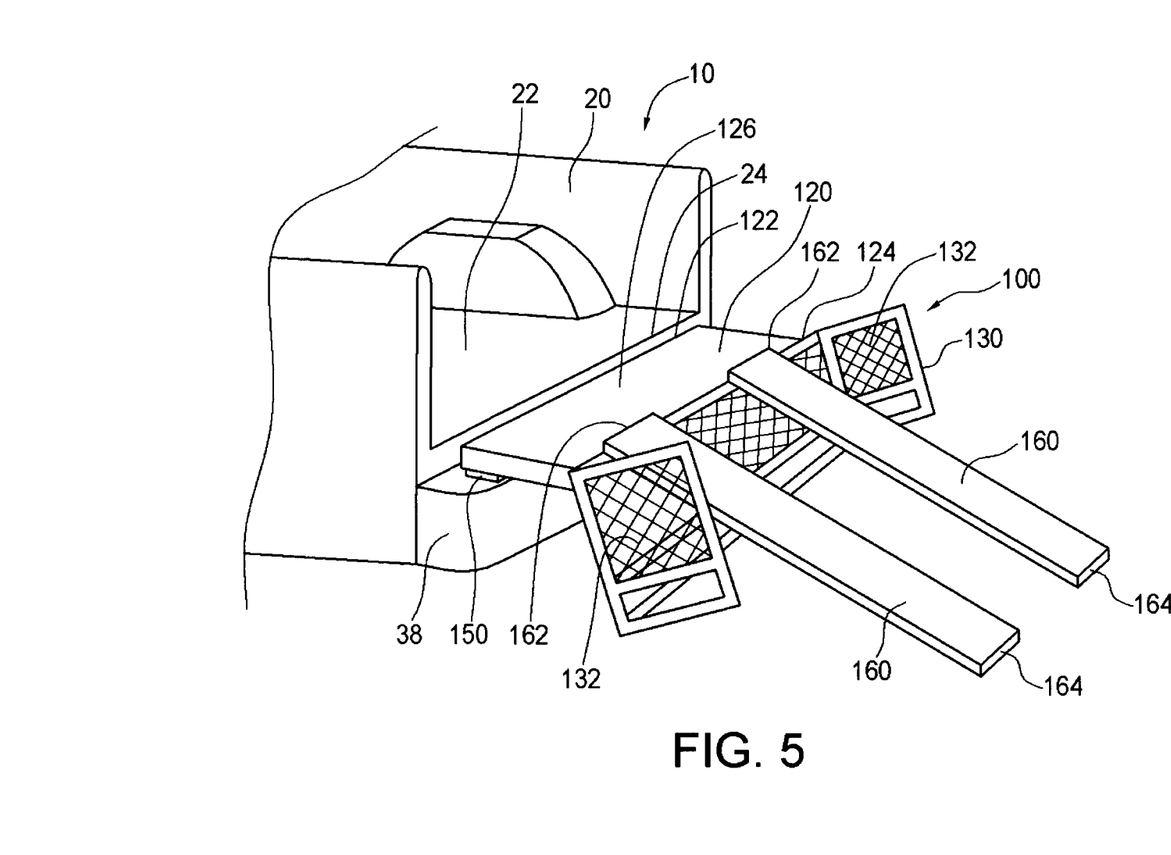
FIG. 5 is a perspective view of the bed extender with ramps attached.

Referring to FIG. 5, if a personal vehicle, such as an ATV, snowmobile, etc. or other heavy cargo is being loaded onto the bed 20 of the truck 10 and the load platform 120, ramps 160 can be used to load the truck 10. The tailgate enclosure 130 can be pivoted down into its open position and the ramps 160 can be placed with their first ends 162 on or attached to the load platform 120. The load can then be moved up or driven up the ramps 160 onto the load platform 120 and onto the floor 22 of the bed 20 of the truck 10. The ramps 160 can then be removed and the tailgate enclosure 130 pivoted upwards into its closed position and secured in place enclosing the cargo in the cargo area.

Figure 6:
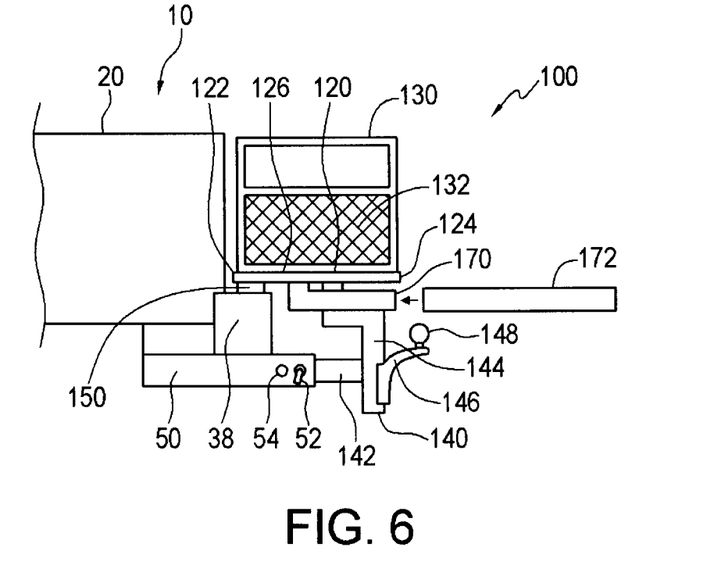
FIG. 6 is a side view of a bed extender with supports for the tailgate enclosure.
Figure 7:
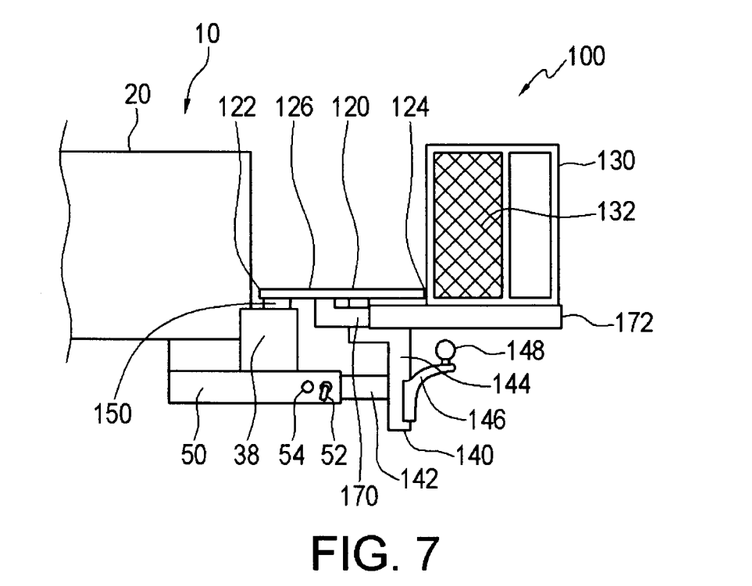
FIG. 7 is a side view of the bed extender of FIG. 6 with support holding the enclosure tailgate in position.

FIGS. 6 and 7 illustrate the bed extender 100 with support mounts 170 and extension members 172 to support the tailgate enclosure 120 in an open position. Support mounts 170 can be positioned beneath the load platform 120. These support mounts 170 can be positioned so that they are extending towards the distal end 124 of the load platform 120, but not extending beyond the distal end 124 of the load platform 120. In one aspect, the support mounts 170 can be square or rectangular tubing.

Extension members 172 can be provided. The extension members 172 can be hollow and have the same cross-sectional shape as the support mounts 170 only with slightly larger dimensions so that they can slide over the support mounts 170. The extension members 172 can be substantially longer than the support mounts 170 so that when the extension members 172 are slid in place over the support mounts 170, the extension members 172 extend beyond the distal end 124 of the load platform 120.

Referring to FIG. 6, the tailgate extender 130 can be moved into its open position. Rather than the tailgate extender 130 being free to pivot downwards below the load platform 120, as shown in FIG. 3, the tailgate extender 130 comes into contact with the extension members 172 can be supported in position by the extension members 172 and the support mounts 170. In one aspect, the extension members 172 and support mounts 170 can be positioned so that the tailgate extender 130 is held in a position substantially horizontally by the extension members 172.

In this manner, if force is placed on the tailgate extender 130 when it is in the open position, such as when cargo is placed on the tailgate extender 130, ramps are placed on the tailgate extender 130, etc., this force is transferred through the extension members 172, the support mounts 170 and the hitch assembly 140 to the hitch receiver 50.

In another aspect, extension members 172 can be telescopically connected to the support mounts 170 so that they can be retracted under the load platform 120 so that the extension members 172 are not extending beyond the distal end 124 of the load platform 120 and the extended into an extended position where they are extending out past the distal end 124 of the load platform 120 to support the tailgate extender 130 in the open position.

Figure 9:
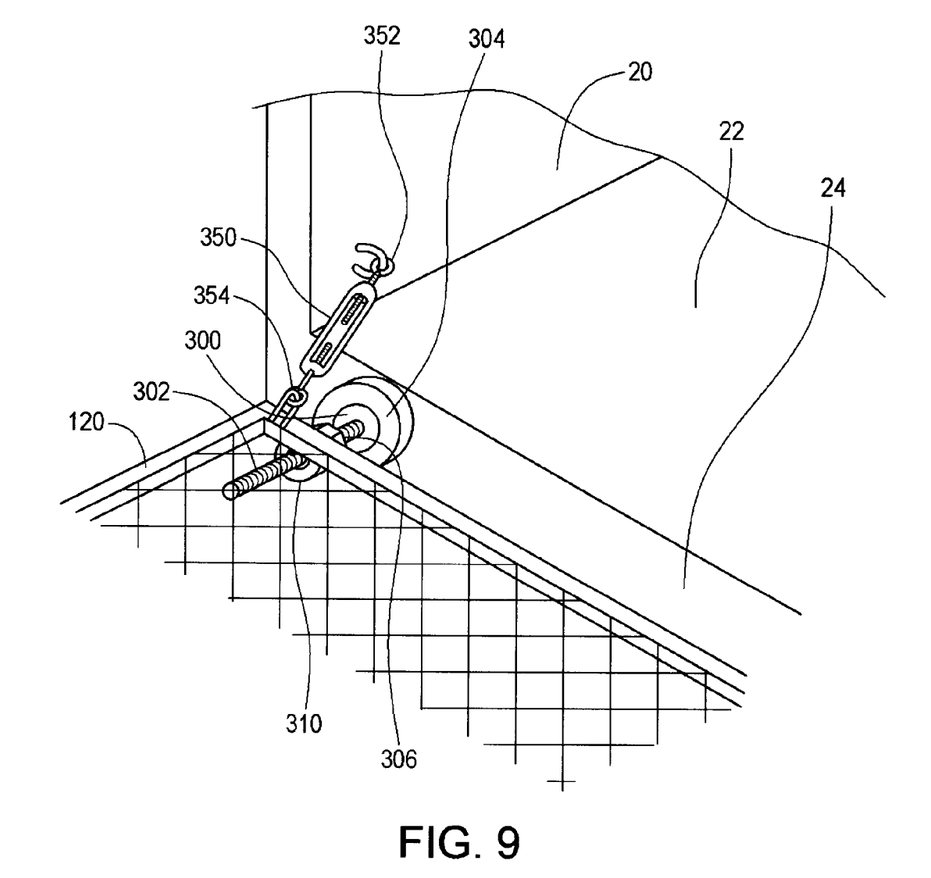
FIG. 9 is a partial view of a compression assembly and a tensioner assembly used to hold the load platform in place relative to a bed of a truck.

In one aspect, a compression assembly 300 can be provided to help secure the load platform 150 relative to the bed 20 of the truck 10. Referring to FIG. 9, in one aspect, the compression assembly 300 can include a threaded rod 302 with a contact end 304. The contact end 304 could be made of a mildly compressible material and is placed in contact with the end 24 of the bed 20 of the truck 10. The threaded rod 302 can be threaded into a mating threaded aperture 310 on the load platform 120. A nut 306 can be provided on the threaded rod 302 between the contact end 304 of the threaded rod 302 and the load platform 120.

In operation, the compression assembly 300 can be rotated in the threaded aperture 210 until the contact end 304 of the compression assembly 300 is securely pressed against an end 24 of the bed 20 of the truck 10, forcing the load platform 120 away from the bed 20 of the truck 10. The nut 306 can then be threaded along the threaded rod 302 until it is snugged against the threaded aperture 310. In this manner, the load platform 120 can be forced away from the bed 20 of the truck and against the front of the hitch assembly 140 preventing the load platform 120 from moving.

A tensioner assembly 350 can be also provided to pull the load platform 120 towards the bed 20 of the truck 10. A first end 352 of the tensioner assembly 350 could be connected to or inside the bed 20 of the truck 10 while a second end 354 can be connected to the load platform 120. This tensioner assembly 350 can be pulling the load platform 120 towards the bed 20 of the truck 10. In one aspect, the tensioner assembly 350 could be a turn buckle to allow a user to tighten the tensioner assembly 350, pulling the load platform 120 towards the bed 20 of the truck. 10.

The compression assembly 300 and the tensioner assembly 350 can act in conjunction with the compression assembly 300 pushing the load platform 120 away from the bed 20 of the truck 10 while the tensioner assembly 350 pulls the load platform 120 towards the bed 20 of the truck 10. The compression assembly 300 and the tensioner assembly 350 acting in conjunction can hold the load platform 120 solidly in place.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:
1. An apparatus for extending a bed of a truck, the apparatus comprising:
    a load platform extending substantially outwards behind a bed of the truck when the load platform is in position and installed on the truck, the load platform having a proximal end and a distal end;
    a hitch assembly having a connection arm adapted for insertion into a hitch receiver on the truck and a support arm extending upwards from the connection arm to the load platform to support at least some of a weight of the load platform; and at least one compression assembly adapted for installation between the load platform and the end of the bed of the truck to force the proximal end of the load platform away from the bed of the truck, wherein the proximal end of the load platform is unconnected to the bed of the truck and adjacent to the bed of the truck when the apparatus is installed on the truck, and wherein the load platform is positioned horizontally when the apparatus is installed on the truck, and wherein the at least one compression assembly has a threaded rod and a contact end, the threaded rod insertable into a threaded aperture on the load platform and rotatable to force the contact end against an end of the bed of the truck.

2. The apparatus of claim 1 further comprising a tailgate enclosure extending upwards and along an entire length of the distal end of the load platform and along sides of the load platform.

3. The apparatus of claim 2 wherein the tailgate enclosure is pivotally connectable to the distal end of the load platform and wherein the tailgate enclosure is pivotably moveable between a closed position and an open position.

4. The apparatus of claim 3 further comprising at least one support mount connectable beneath the load platform and operative to receive an extension member that can hold the tailgate enclosure in position when the tailgate enclosure is in the open position.

5. The apparatus of claim 3 further comprising at least one brace positioned between a bottom corner of the tailgate enclosure and the load platform.

6. The apparatus of claim 1 wherein a top surface of the load platform is positioned substantially level with the bed of the truck when the apparatus is installed in place on the truck.

7. The apparatus of claim 1 wherein the hitch assembly holds the load platform in a fixed and rigid relation to the hitch receiver of the truck.

8. The apparatus of claim 1 wherein the hitch assembly is adjustable horizontally relative the hitch receiver.

9. The apparatus of claim 8 wherein the hitch assembly is adjustable vertically relative to the hitch receiver.

10. The apparatus of claim 1 wherein the hitch receiver further comprises a draw bar.

11. The apparatus of claim 1 wherein the proximal end of the load platform is supported by a bumper of the truck when the apparatus is installed on the truck.

12. A method of installing a bed extender on a truck, the method comprising:

removing a tailgate of truck;

inserting a hitch assembly into a hitch receiver on the truck, the hitch assembly having a connection arm adapted for insertion into the hitch receiver and a support arm extending upwards from the connection arm to a load platform to support at least some of a weight of the load platform; and positioning the load platform so that the load platform extends from the bed of the truck with a proximal end of the load platform unconnected to the bed of the truck and adjacent to an end of the bed of the truck, wherein the load platform is positioned horizontally when the apparatus is installed on the truck.

13. The method of claim 12 wherein the load platform is positioned where an open tailgate would be positioned.

14. The method of claim 12 further comprising providing a tailgate enclosure extending upwards and along an entire length of the distal end of the load platform and along sides of the load platform, the tailgate enclosure pivotally connectable to the distal end of the load platform and pivotal between an open position and a closed position.

15. The method of claim 12 wherein a top surface of the load platform is positioned substantially level with the bed when the load platform is installed in place on the truck.

16. The method of claim 12 wherein the hitch assembly holds the load platform in a fixed and rigid relation to the hitch receiver of the truck.

17. The method of claim 12 further comprising adjusting the hitch assembly at least one of horizontally and vertically relative to the hitch receiver to align a top surface of the load platform with the bed of the truck.

18. The method of claim 12 wherein the proximal end of the load platform is supported by a bumper of the truck when the apparatus is installed on the truck.

\* \* \* \* \*